United States Patent
Onishi et al.

(10) Patent No.: US 6,635,379 B2
(45) Date of Patent: Oct. 21, 2003

(54) BATTERY SEALING INSPECTION METHOD

(75) Inventors: Masato Onishi, Toyohashi (JP); Michio Osawa, Toyohashi (JP); Katsuyuki Tomioka, Toyohashi (JP); Noriyuki Fujioka, Kosai (JP); Tomoharu Saito, Toyohashi (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 154 days.

(21) Appl. No.: 09/788,537

(22) Filed: Feb. 21, 2001

(65) Prior Publication Data

US 2001/0016278 A1 Aug. 23, 2001

(30) Foreign Application Priority Data

Feb. 22, 2000 (JP) ........................... 2000-044101

(51) Int. Cl.$^7$ .............................................. H01M 10/42
(52) U.S. Cl. .............................. 429/49; 429/48; 429/53; 429/90
(58) Field of Search ........................... 429/48, 49, 53, 429/90

(56) References Cited

U.S. PATENT DOCUMENTS

| | | |
|---|---|---|
| 3,793,876 A | 2/1974 | Oswald |
| 4,097,803 A | 6/1978 | Feldman |
| 4,433,294 A | 2/1984 | Windebank |
| 4,913,986 A * | 4/1990 | Howard et al. ............ 429/174 |
| 5,170,124 A | 12/1992 | Blair et al. |
| 5,581,170 A | 12/1996 | Mammano et al. |
| 6,002,238 A | 12/1999 | Champlin |
| 6,044,331 A | 3/2000 | Saigo |
| 6,073,665 A * | 6/2000 | Takeyama et al. ........ 141/100 |
| 6,222,345 B1 | 4/2001 | Yamanashi |
| 6,313,637 B1 | 11/2001 | Iino et al. |
| 6,351,983 B1 * | 3/2002 | Haas et al. ............... 250/281 |
| 6,477,024 B1 | 11/2002 | Kikuchi et al. |

FOREIGN PATENT DOCUMENTS

| | | | |
|---|---|---|---|
| FR | 2611314 | 8/1988 | |
| JP | 61-99273 | * 5/1986 | ............ H01M/6/14 |
| JP | 4-25738 | 1/1992 | |
| JP | 5-21089 | 1/1993 | |
| WO | 98/48290 | 10/1998 | |

OTHER PUBLICATIONS

J. McMurry and R. C. Fay, "Chemistry," 2$^{nd}$ edition, Prentice–Hall, Inc. (1998).*
English Language Abstract of JP 4–25738.
English Language Abstract of JP 5–21089.
Yoshitaka Konya et al., entitled "A Deterioration Estimating System for 200–Ah Sealed Lead Acid Batteries", XP 000623339, published Oct. 30, 1994, pp. 256–262.
Fumihiko Asakawa et al., Journal of Technical Disclosure, Journal No. 98–3030, entitled "Battery Deterioration Detection Device", issued May 1, 2000.
English Language Abstract of 2611314.
English Language Abstract of JP 4–25738.

* cited by examiner

Primary Examiner—Carol Chaney
Assistant Examiner—Dah-Wei Yuan
(74) Attorney, Agent, or Firm—Greenblum & Bernstein, P.L.C.

(57) ABSTRACT

A battery which has undergone initial charging and discharging is placed inside a sealed vessel, which is evacuated by a vacuum pump. After this evacuated state has been maintained for a while, the density of hydrogen gas within the sealed vessel is measured by a hydrogen density sensor, based on which the presence or absence of a gas escape from the battery is determined. The battery may be heated instead of subjecting it to charging and discharging.

11 Claims, 1 Drawing Sheet

BATTERY SEALING INSPECTION METHOD

BACKGROUND OF THE INVENTION

The present disclosure relates to subject matter contained in priority Japanese Patent Application No. 2000-044101, filed on Feb. 22, 2000, the contents of which is herein expressly incorporated by reference in its entirety.

1. Field of the Invention

The present invention relates to a method of inspecting sealing property of battery.

2. Description of Related Art

FIG. 2 illustrates a conventional battery sealing inspection method for verifying the sealing properties of a sealed battery case. The battery case 21 is closed with a sealing plate, in which a hole 22 is formed for mounting a safety vent or the like. Compressed gas is introduced from a high-pressure gas source 23 via a valve 24 into the battery case 21, and the pressure inside the battery case 21 is measured by a pressure gauge 25. When the pressure inside the battery case 21 has reached a predetermined value, the valve 24 is closed, and pressure change thereafter inside the battery case 21 is measured by the pressure gauge 25. If a fall in pressure is observed, then the battery is identified to be a defective battery in which gas is leaking out from the battery case.

Another prior art battery sealing inspection method as disclosed in Japanese Laid-open Patent Application No. 4-25738 includes introducing of compressed hydrogen gas into a battery case, and detecting the hydrogen gas leaking out from the battery case by collector plates and a semiconductor gas sensor.

In the inspection method illustrated in FIG. 2, the amount of gas leaking from the battery case 21, if any, is fairly small relative to the volume of the battery case 21, and hence the pressure drop inside the battery case 21 due to gas leakage is very small. Therefore, detection accuracy is relatively low, because detection of gas leakage is possible only when there is a hole or a gap of more than 100 $\mu$m. In order to ensure accurate detection of gas leakage with this method, it takes at least 5 to 10 minutes per each battery, resulting in extremely poor efficiency. Moreover, since the compressed air is introduced into the battery case through the hole 22 for mounting a safety vent or the like prior to the actual mounting of such parts, it was necessary to inspect the sealing properties of the battery after the safety vent has been mounted on the battery case by welding. Thus the method involves a further leakage test with respect to the welds.

In the method disclosed in Japanese Laid-open Patent Application No. 4-25738, since there is no assurance that the leaked gas will always be collected accurately by the collector plates, there are variations in detection accuracy. Also, similarly to the former method, this method involves a further inspection of sealing properties of the battery case with respect to the portion through which compressed air is introduced into the battery case.

SUMMARY OF THE INVENTION

In view of the foregoing problems of the prior art, an object of the present invention is to provide a battery sealing inspection method whereby gas leakage from any location on a battery case is detected with a high degree of accuracy, good efficiency, and high reliability.

In a method for inspecting sealing properties of a battery according to the present invention, the battery is made to undergo charging and discharging before being placed within a sealed vessel. The sealed vessel is then evacuated, and a certain low pressure inside thereof is maintained for a predetermined period of time. The density of a gas within the sealed vessel, the gas being a gas generated within the battery, is measured, based on which it is determined whether there is a gas leak from the battery, by comparing the measured gas density with a preliminarily obtained reference value.

The characteristic feature of the invention is that the battery is charged and discharged prior to inspection so as to raise the internal pressure of the battery. Moreover, the sealed vessel in which the battery is placed is evacuated so as to make the internal pressure of the battery even higher relative to its ambient pressure. Since the battery is housed within the sealed vessel, a gas leak, even in a slightest amount, from any location of the battery is detected by the measurement of gas density within the sealed vessel. Thus the inspection method ensures detection of a hole or a crack as small as about 10 $\mu$m with good efficiency and high reliability.

The inspection should preferably be performed immediately after the battery has undergone initial charging and discharging, where the internal pressure of the battery is particularly high.

In another embodiment of the invention, a battery which has been filled with electrolyte and has been sealed is placed within a sealed vessel, and is heated to a predetermined temperature. The sealed vessel is then evacuated, and a certain low pressure inside thereof is maintained for a predetermined period of time. The density of a gas within the sealed vessel, the gas being a gas generated within the battery, is measured, based on which it is determined whether there is a gas leak from the battery, by comparing the measured gas density with a preliminarily obtained reference value.

In this embodiment, the battery is heated instead of subjected to charging and discharging in order to raise the internal pressure thereof. Therefore the inspection is performed with good efficiency and high reliability similarly to the above described embodiment. This embodiment is also effective for the inspection of batteries that have been stored for a long period of time after initial charging and discharging.

The battery should preferably be heated to a temperature between 45° C. and 80° C., and more preferably to 65° C. plus or minus 5° C. This temperature range enables the battery internal pressure to be a level optimal for accurate detection of gas leakage, while preventing degradation of other members which will not withstand high heat such as separators.

The gas generated within the battery is hydrogen, and the reference value is obtained by measuring hydrogen density in an ambient atmosphere prior to evacuation of the sealed vessel. In this way, the inspection is performed without being affected by the initial hydrogen density of ambient atmosphere, and gas leakage is accurately detected.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

One embodiment of a battery sealing inspection method according to the present invention will be hereinafter described with reference to FIG. 1.

Figure 1:
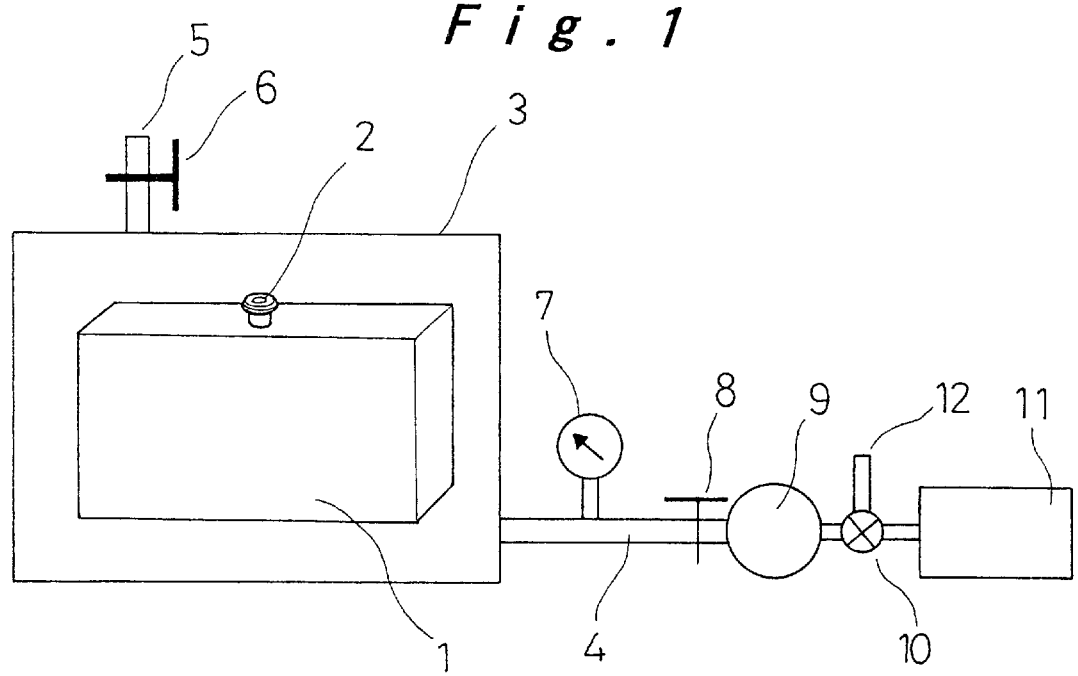
FIG. 1 is a schematic diagram showing one embodiment of a battery sealing inspection method according to the present invention.
Figure 2:
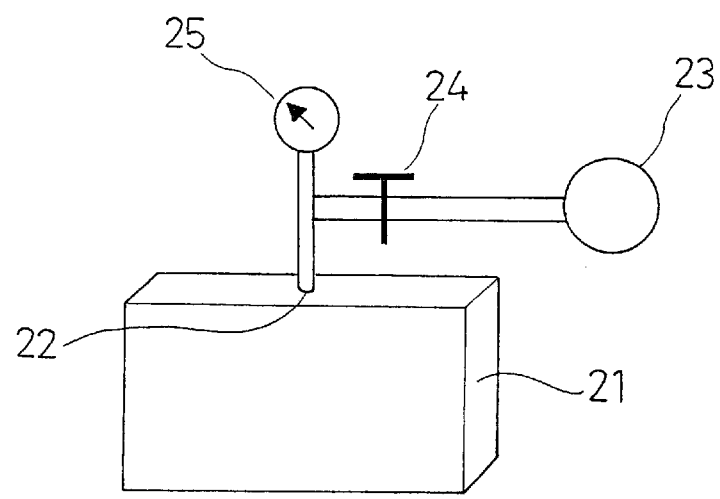
FIG. 2 is a schematic diagram showing a conventional battery sealing inspection method.

In FIG. 1, reference numeral 1 denotes a battery, such as a nickel metal hydride battery which is the object of inspection. The battery includes a safety vent 2 for discharging hydrogen gas externally in the event that the internal pressure has reached a predetermined value or above. Reference numeral 3 denotes a hermetically sealed vessel for accommodating therein the battery 1 to perform sealing inspection. The vessel 3 is connected to a vacuum exhaust tube 4 and is provided with an air inlet 5 which can be opened or closed by means of a valve 6.

A pressure gauge 7, a valve 8, a vacuum pump 9, a switching valve 10, and a hydrogen density sensor 11, are serially connected to the vacuum exhaust tube 4 in this order from the sealed vessel side. The switching valve 10 connected between the vacuum pump 9 and the hydrogen density sensor 11 has an air inlet 12, and switches from one to another of three states: In a first state, the outlet of the vacuum pump 9 is connected to the air inlet 12 of the switching valve 10; in a second state, the outlet of the vacuum pump 9 is connected to the hydrogen density sensor 11; and in a third state, the air inlet 12 of the switching valve 10 is connected to the hydrogen density sensor 11.

Before inspecting the sealing property of the battery 1, the battery 1 is filled with electrolyte, sealed, and made to undergo initial charging and discharging, so that the battery 1 is activated and an internal pressure generated therein. Meanwhile, the switching valve 10 is switched to the third state where the air inlet 12 of the switching valve 10 is communicated with the hydrogen density sensor 11, for measuring the hydrogen density in the atmosphere. The value thus obtained is taken as the atmospheric hydrogen density A.

Thereupon, the battery 1 which has completed charging and discharging is placed inside the sealed vessel 3, and the valve 6 of the air inlet 5 is closed, while the valve 8 of the vacuum exhaust tube 4 is opened. Meanwhile, the switching valve 10 is switched to the first state where the outlet of the vacuum pump 9 communicates with the air inlet 12 of the switching valve 10. The vacuum pump 9 is then operated, so as to reduce the pressure inside the sealed vessel 3 to 10 kPa.

After maintaining the internal pressure of the sealed vessel 3 at 10 kPa for approximately 1 minute to several minutes, the switching valve 10 is switched to the second state where the outlet of the vacuum pump 9 is connected to the hydrogen density sensor 11, so as to introduce the air inside the sealed vessel 3 into the hydrogen density sensor 11, for measuring the hydrogen density inside the sealed vessel 3. The value thus measured is taken as the sealed vessel hydrogen density B. Thereupon, the presence or absence of a gas escape from the battery 1 is judged based on a difference between the atmospheric hydrogen density A and the sealed vessel hydrogen density B.

According to this embodiment of the invention, prior to inspection, the battery 1 is made to undergo initial charging and discharging, so as to increase the internal pressure of the battery. Moreover, the battery is placed in the sealed vessel 3 so that the battery ambient pressure is in a vacuum state, whereby the internal pressure of the battery is made even higher relative to the outside of the battery. Since the inspection of gas leakage is effected by detecting small molecules of hydrogen gas, even a slightest gas leakage is readily detected. Moreover, since the battery 1 is placed inside the sealed vessel 3, it is possible to detect gas escape from any location of the battery 1 by the hydrogen density sensor 11. Accordingly, the inspection is performed in a short time with high accuracy, good efficiency, and high reliability. Defective batteries are readily detected particularly when the inspection is performed on a battery immediately after the initial charging and discharging whereby the internal pressure of the battery has been increased. Also, the determination as to whether there is any gas leakage is not affected by the initial atmospheric gas density, because the judgment is made based on the difference between a reference value of the atmospheric hydrogen density A which is previously measured and the hydrogen density B in the sealed vessel 3.

A modification may be made to the above described arrangement for battery sealing inspection method. The arrangement is substantially the same as that shown in FIG. 1, with the exception that a heater (not illustrated) such as an infrared lamp is provided within the sealed vessel 3 for heating the battery 1.

For the sealing inspection, the battery 1 is filled with electrolyte, sealed, and placed within the sealed vessel 3. Meanwhile, the switching valve 10 is switched to the third state where the air inlet 12 of the switching valve 10 is communicated with the hydrogen density sensor 11, for measuring the hydrogen density in the atmosphere. The value thus obtained is taken as the atmospheric hydrogen density A.

Thereupon, the battery 1 is heated to a temperature of approximately 65° C., by means of the infrared lamp (not illustrated) disposed inside the sealed vessel 3. Preferably, the battery is heated to a temperature of 45° C. to 80° C., and more preferably to 65° C. plus or minus 5° C. This is because the equilibrium pressure inside the battery at a temperature of 45° C. is 0.02 to 0.03 MPa, whereas it is 0.15 to 0.20 MPa at a temperature of 80° C., and therefore, at a temperature below 45° C., the internal pressure of the battery is too low to effect inspection to a desired degree of accuracy. On the other hand, if the temperature is above 80° C., it will cause degradation of the other parts which will not withstand high heat such as separators.

Similarly to the aforementioned embodiment, the interior of the sealed vessel 3 is evacuated and after maintaining this state for a predetermined period of time, the hydrogen density inside the sealed vessel 3 is measured by the hydrogen density sensor 11, and hence a sealed vessel hydrogen density B is obtained. The presence or absence of a gas escape from the battery 1 is judged from the difference between the atmospheric hydrogen density A and the sealed vessel hydrogen density B.

According to this embodiment, the battery 1 is heated so that gas is generated inside the battery 1 and the internal pressure of the battery raised, in a similar manner to a case where a battery 1 is subjected to initial charging and discharging. Thus the inspection of sealing properties of the battery is efficiently and reliably performed.

This embodiment is particularly effective for the inspection of sealing property of batteries which have been stored for a long period of time after initial charging and charging.

According to the battery sealing inspection method of the present invention, the battery is either subjected to initial charging or discharging, or heated, to raise the internal pressure thereof, prior to the inspection of its sealing properties. The battery is placed in a sealed vessel, which is evacuated to obtain a substantial difference between the pressure within the battery and its ambient pressure. The gas density within the sealed vessel is measured after a certain period of time, whereby gas escape from any location on the battery is detected in a reliable manner. With this method, even a slightest amount of gas leaking from anywhere on the battery causes changes in the gas density within the sealed vessel, and therefore gas leakage is detected accurately for a short time with good efficiency and high reliability.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of inspecting sealing properties of a nickel metal hydride battery, comprising the steps of:
    charging and discharging the nickel metal hydride battery;
    then placing the nickel metal hydride battery within a sealed vessel;
    evacuating the interior of the sealed vessel and maintaining a predetermined low pressure level for a period of time;
    measuring density of a gas within the sealed vessel, the gas being a gas generated within the nickel metal hydride battery; and
    determining whether there is a gas leak from the nickel metal hydride battery by comparing the measured gas density with a preliminarily obtained reference value.

2. The method of inspecting sealing properties of a battery according to claim 1, wherein the inspection is performed immediately after the battery has undergone initial charging and discharging.

3. The method of inspecting sealing properties of a battery according to claim 1, wherein the reference value is obtained by measuring density of the gas in an ambient atmosphere prior to evacuation of the sealed vessel.

4. The method of inspecting sealing properties of a battery according to claim 3, wherein the gas generated within the battery is hydrogen.

5. A method of inspecting sealing properties of a nickel metal hydride battery, comprising the steps of:
    placing the nickel metal hydride battery which has been filled with electrolyte and has been sealed inside a sealed vessel;
    heating the nickel metal hydride battery;
    evacuating the interior of the sealed vessel and maintaining a predetermined low pressure level for a period of time;
    measuring density of a gas within the sealed vessel, the gas being a gas generated within the nickel metal hydride battery; and
    determining whether there is a gas leak from the nickel metal hydride battery by comparing the measured gas density with a preliminarily obtained reference value.

6. The method of inspecting sealing properties of a battery according to claim 5, wherein the battery is heated to a temperature between 45° C. and 80° C.

7. The method of inspecting sealing properties of a battery according to claim 6, wherein the battery is heated to a temperature of 60° C.±5° C.

8. The method of inspecting sealing properties of a battery according to claim 5, wherein the reference value is obtained by measuring density of the gas in an ambient atmosphere prior to evacuation of the sealed vessel.

9. The method of inspecting sealing properties of a battery according to claim 8, wherein the gas generated within the battery is hydrogen.

10. An apparatus for inspecting sealing properties of a nickel metal hydride battery, comprising:
    a vessel for housing therein a nickel metal hydride battery to be inspected, provided with a vacuum pump so as to be evacuated;
    a hydrogen density sensor connected to the vacuum pump; and
    means for switchably connecting the vacuum pump with the hydrogen density sensor, the vacuum pump with atmosphere, and the hydrogen density sensor with atmosphere.

11. An apparatus for inspecting sealing properties of a battery according to claim 10 further comprising a heater provided within the vessel.

* * * * *